United States Patent
Jin

(10) Patent No.: US 7,714,967 B2
(45) Date of Patent: May 11, 2010

(54) MULTI-DOMAIN LIQUID CRYSTAL DISPLAY DEVICE AND METHOD FOR FABRICATING THE SAME

(75) Inventor: Hyun Suk Jin, Kyonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/314,074

(22) Filed: Dec. 3, 2008

(65) Prior Publication Data
US 2009/0153786 A1 Jun. 18, 2009

Related U.S. Application Data

(62) Division of application No. 10/867,008, filed on Jun. 15, 2004, now Pat. No. 7,463,322.

(30) Foreign Application Priority Data
Jun. 30, 2003 (KR) .................. 10-2003-0043945

(51) Int. Cl.
*G02F 1/1337* (2006.01)
(52) U.S. Cl. ...................... 349/129; 349/130
(58) Field of Classification Search .......... 349/129, 349/130
See application file for complete search history.

(56) References Cited

U.S. PATENT DOCUMENTS

| 6,097,467 | A | 8/2000 | Fujimaki et al. |
| 6,407,791 | B1 | 6/2002 | Suzuki et al. |
| 6,839,112 | B2 | 1/2005 | Chien et al. |
| 2003/0043336 | A1 | 3/2003 | Sasaki et al. |
| 2003/0112397 | A1 | 6/2003 | Lee |
| 2003/0128315 | A1* | 7/2003 | Tashiro et al. ............... 349/113 |
| 2003/0202144 | A1 | 10/2003 | Kim et al. |

FOREIGN PATENT DOCUMENTS

KR 1020030047851 6/2003

* cited by examiner

*Primary Examiner*—Mike Qi
(74) *Attorney, Agent, or Firm*—Morgan, Lewis & Bockius LLP

(57) ABSTRACT

A multi-domain liquid crystal display (LCD) device includes a first substrate having a plurality of pixel regions each divided into at least first and second domains, a plurality of pixel electrodes each within one of the pixel regions of the first substrate, each of the pixel electrodes having a plurality of protrusions arranged along different directions within the at least first and second domains, a second substrate facing the first substrate, and a liquid crystal layer between the first and second substrates.

6 Claims, 12 Drawing Sheets

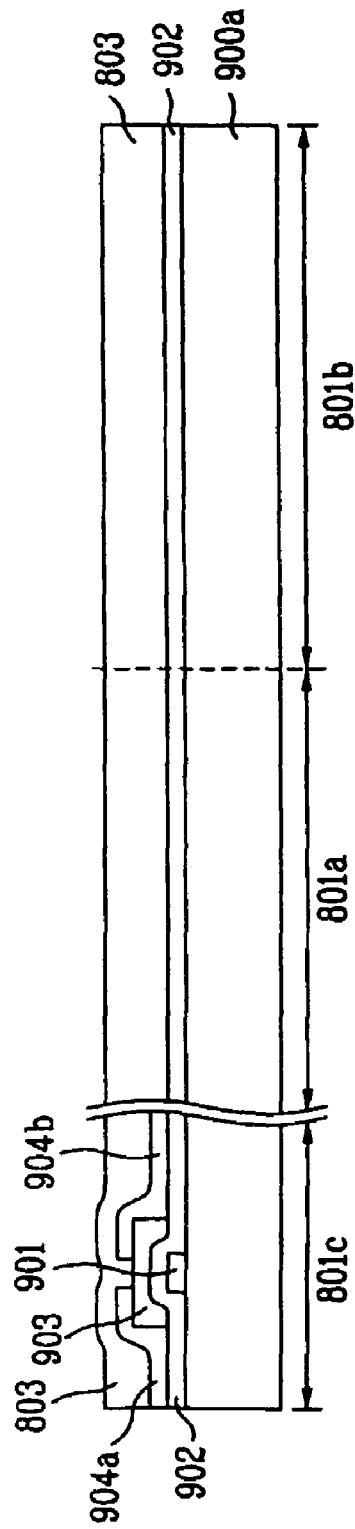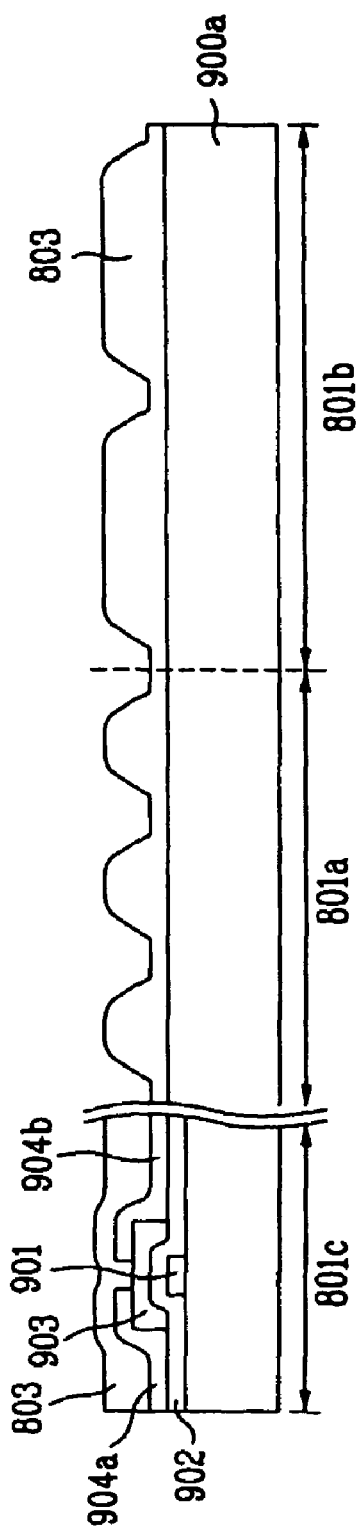

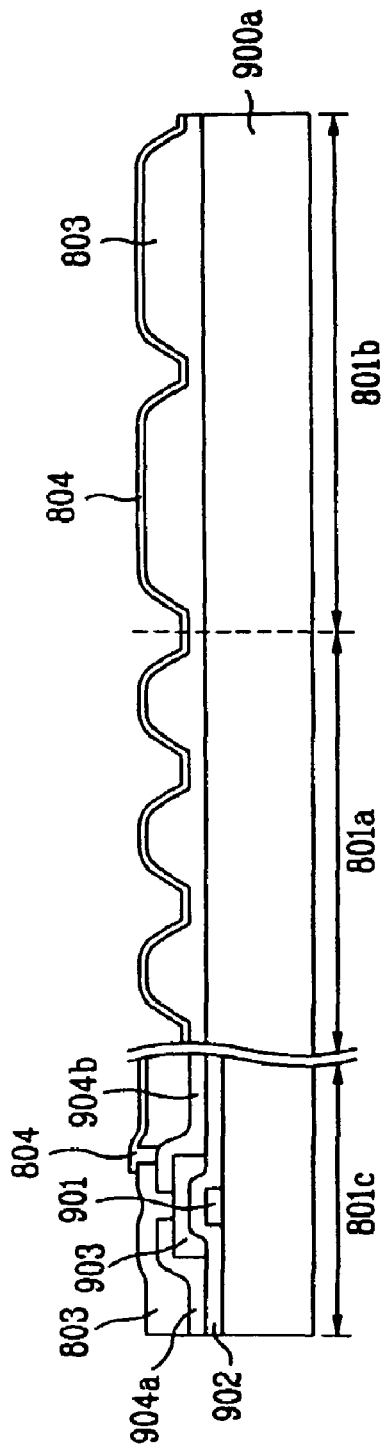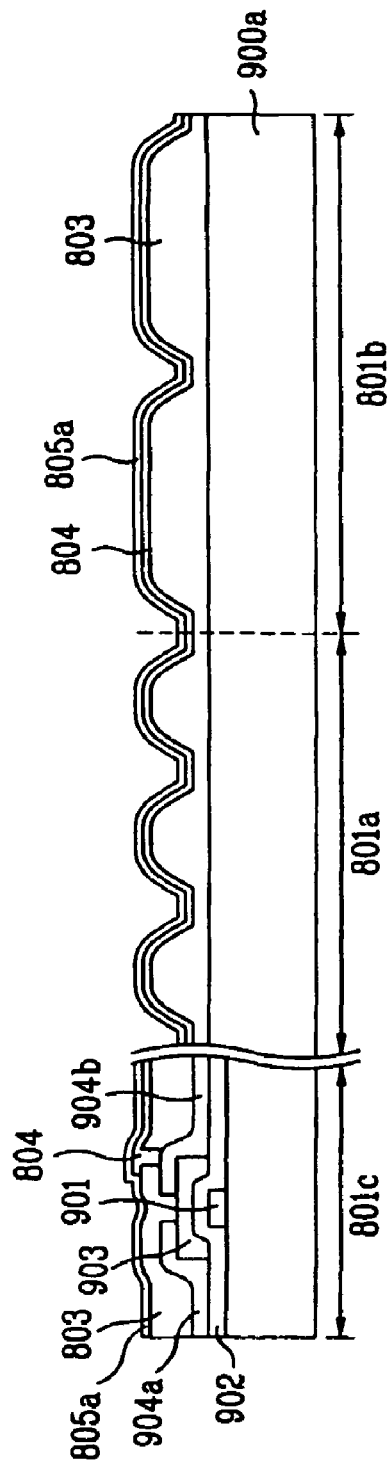

MULTI-DOMAIN LIQUID CRYSTAL DISPLAY DEVICE AND METHOD FOR FABRICATING THE SAME

This application is a Divisional of U.S. patent application Ser. No. 10/867,008, filed Jun. 15, 2004, now U.S. Pat. No. 7,463,322 and claims the benefit of Korean Patent Application No.; P2003-43945, filed in Korea on Jun. 30, 2003, which are hereby incorporated by reference in their entirety.

BACKGROUND OF THE INVENTION

1. Field of the Invention

The present invention relates to a liquid crystal display (LCD) device and a method for fabricating an LCD device, and more particularly, to a multi-domain liquid crystal display (LCD) device and a method for fabricating an LCD device.

2. Discussion of the Related Art

As demand for various types of display devices increases various flat display devices, such as liquid crystal display (LCD) devices, plasma display panel (PDP) devices, electroluminescent display (ELD) devices, and vacuum fluorescent display (VFD) devices, are being developed. Some of the flat display devices are commonly used due to characteristics of thin profile, light weight, and low power consumption, thereby substituting cathode ray tube (CRT) devices with the LCD devices. In addition, mobile type LCD devices, such as displays for notebook computers, are being developed, and LCD devices were developed for computer monitors and televisions.

Despite various technical developments within the LCD device technology, enhancement of picture quality of the LCD device has been lacking. Thus, in order to use the LCD devices as general display devices, the development of LCD devices having high image quality, such as high resolution and luminance, with large-sized screens is necessary while still maintaining light weight, thin profile, and low power consumption. Currently, multi-domain LCD devices having at least two different alignment directions within one pixel region have been developed to obtain LCD devices having wide viewing angles.

FIG. 1 is a schematic perspective view of an LCD device according to the related art. In FIG. 1, an LCD device includes first and second substrates 1 and 2, and a liquid crystal layer 3 formed by injecting liquid crystal between the first and second substrates 1 and 2. More specifically, the first substrate 1 includes a plurality of gate lines 4 arranged along a first direction at fixed intervals, a plurality of data lines 5 arranged along a second direction perpendicular with the gate lines at fixed intervals to define a plurality of pixel regions P, a plurality of pixel electrodes 6 each within the pixel regions defined by the plurality of gate and data lines, and a plurality of thin film transistors (TFTs) T being turned ON and OFF according to driving signals transmitted along the gate lines 4 for passing video signals transmitted along the data lines to the pixel electrodes 6.

The second substrate includes a black matrix layer 7 for preventing light leakage within regions, except the pixel regions of the first substrate, and R/G/B color filter layers for producing colored light, and a common electrode 9. Although not shown, alignment layers are formed on opposing surfaces of the first and second substrates 1 and 2 to align liquid crystal molecules of the liquid crystal layer 3 by a rubbing method. Accordingly, the thin film transistor T includes a gate electrode that protrudes from the gate line 4, a gate insulating layer formed along an entire surface of the first substrate 1, a source electrode that protrudes from the data line 5, and a drain electrode opposing the source electrode.

The pixel electrode 6 is formed of transparent conductive metal having a high transmittance of light, such as indium-tin-oxide (ITO), and the liquid crystal layer 3 is formed of Twisted Nematic (TN) mode liquid crystal material, wherein the light oscillating along a longitudinal direction of the liquid crystal molecules has a first refractive index different from a second refractive index of the light oscillating along a direction vertical to the longitudinal direction of the liquid crystal molecules, thereby creating narrow viewing angles. Accordingly, instead of using the TN mode liquid crystal material, the liquid crystal layer is formed of Vertical Alignment (VA) mode liquid crystal material, whereby the liquid crystal molecules are aligned along different directions by distorting an electric field.

FIG. 2 is a cross sectional view of a unit pixel for a multi-domain LCD device according to the related art. In FIG. 2, upper and lower substrates 70 and 80 are formed to oppose each other, and a liquid crystal layer 90 is formed between the upper and lower substrates 70 and 80. In addition, projections 60 are formed along inner facing surfaces of the upper and lower substrates 70 and 80, wherein one projection 60 is formed at a center position of the inner surface of the upper substrate 70, and the other projections 60 are formed on the left and right sides of the inner surface of the lower substrate 80. If the projection 60 is formed of a material having a dielectric constant lower than a dielectric constant of the liquid crystal molecule 92, the electric field 94 (arrow direction) is formed outward to the projection 60 of the upper substrate 70. In addition, the liquid crystal molecules 92 are aligned in perpendicular to the electric field 94, whereby the arrangement of the liquid crystal molecules is divided into first and second domains A and B. Thus, distortion of the electric field is attenuated as the difference of the dielectric constant between the projection 60 and the liquid crystal molecule 92 increases. Accordingly, as the projections 60 are formed of material having a dielectric constant greater than a dielectric constant of the liquid crystal molecule 92, it is possible to obtain a stable multi-domain LCD device.

However, the related art multi-domain LCD device has the following disadvantages. In the related art multi-domain LCD device, the distortion of the electric field is formed by the projections formed on the inner surfaces of the lower and upper substrates. As a result, the aperture ratio lowers by the occupying area of the projections on the inner surfaces of the lower and upper substrates, thereby lowering the luminance. However, since the multi-domain LCD device requires rubbing fixation or electrode structures to determine the alignment direction of the liquid crystal molecules, complicated manufacturing processes are required that increase manufacturing costs.

SUMMARY OF THE INVENTION

Accordingly, the present invention is directed to a multi-domain LCD device and a method for fabricating a multi-domain LCD device that substantially obviates one or more problems due to limitations and disadvantages of the related art.

An object of the present invention is to provide a multi-domain LCD device having improve aperture ratio.

Another object of the present invention is to provide a method for fabricating a multi-domain LCD device having improve aperture ratio.

Another object of the present invention is to provide a method for fabricating a multi-domain LCD device having simplified manufacturing processes.

Additional features and advantages of the invention will be set forth in the description which follows, and in part will be apparent from the description, or may be learned from practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, a multi-domain liquid crystal display (LCD) device includes a first substrate having a plurality of pixel regions each divided into at least first and second domains, a plurality of pixel electrodes each within one of the pixel regions of the first substrate, each of the pixel electrodes having a plurality of protrusions arranged along different directions within the at least first and second domains, a second substrate facing the first substrate, and a liquid crystal layer between the first and second substrates.

In another aspect, a multi-domain liquid crystal display (LCD) device includes a plurality of gate and data lines perpendicular to each other on a first substrate defining a plurality of pixel regions, each of the pixel regions divided into at least first and second domains, a plurality of thin film transistors each at a crossing portion of the gate and data lines, an insulating layer within each of the pixel regions and having a plurality of first protrusions arranged along different directions in each of the first and second domains of the pixel regions, a plurality of pixel electrodes on the insulating layer, each pixel electrode having a plurality of second protrusions corresponding to the first protrusions of the insulating layer, a second substrate having a black matrix layer and a color filter layer, and a liquid crystal layer between the first and second substrates.

In another aspect, a method for fabricating a multi-domain liquid crystal display (LCD) device includes preparing first and second substrates, the first substrate having a plurality of pixel regions each divided into at least first and second domains, forming a plurality of pixel electrodes in the pixel regions of the first substrate, each of the pixel electrodes having a plurality of protrusions arranged along different directions within one of the at least first and second domains, and forming a liquid crystal layer between the first and second substrates.

In another aspect, a method for fabricating a multi-domain liquid crystal display (LCD) device includes forming a plurality of gate and data lines perpendicular to each other on a first substrate to define a plurality of pixel regions, each of the pixel regions includes at least first and second domains, forming a gate insulating layer along an entire surface of the substrate including the gate lines, forming a plurality of semiconductor layers on the gate insulating layer, each semiconductor layer disposed above a gate electrode corresponding to the gate lines, forming source and drain electrodes on each of the semiconductor layers, the source electrode extending from one of the data lines, forming an insulating layer on the first substrate, etching the insulating layer to form a plurality of first protrusions having first major-axes directions within the at least first domain and to form a plurality of second protrusions having second major-axes directions within the at least second domain, each of the first major-axes directions being different from each of the second major-axes directions, forming a plurality of pixel electrodes on the plurality of first protrusions and the plurality of second protrusions, forming a first alignment layer along an entire surface of the first substrate including the pixel electrodes, forming a black matrix layer and a color filter layer on a second substrate, attaching the first and second substrates together, and forming a liquid crystal layer between the first and second substrates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 7A to FIG. 7E are cross sectional views of an example method of fabricating a multi-domain LCD device according to the present invention.

DETAILED DESCRIPTION OF THE PREFERRED EMBODIMENTS

Reference will now be made in detail to the preferred embodiments of the present invention, examples of which are illustrated in the accompanying drawings.

Figure 3:
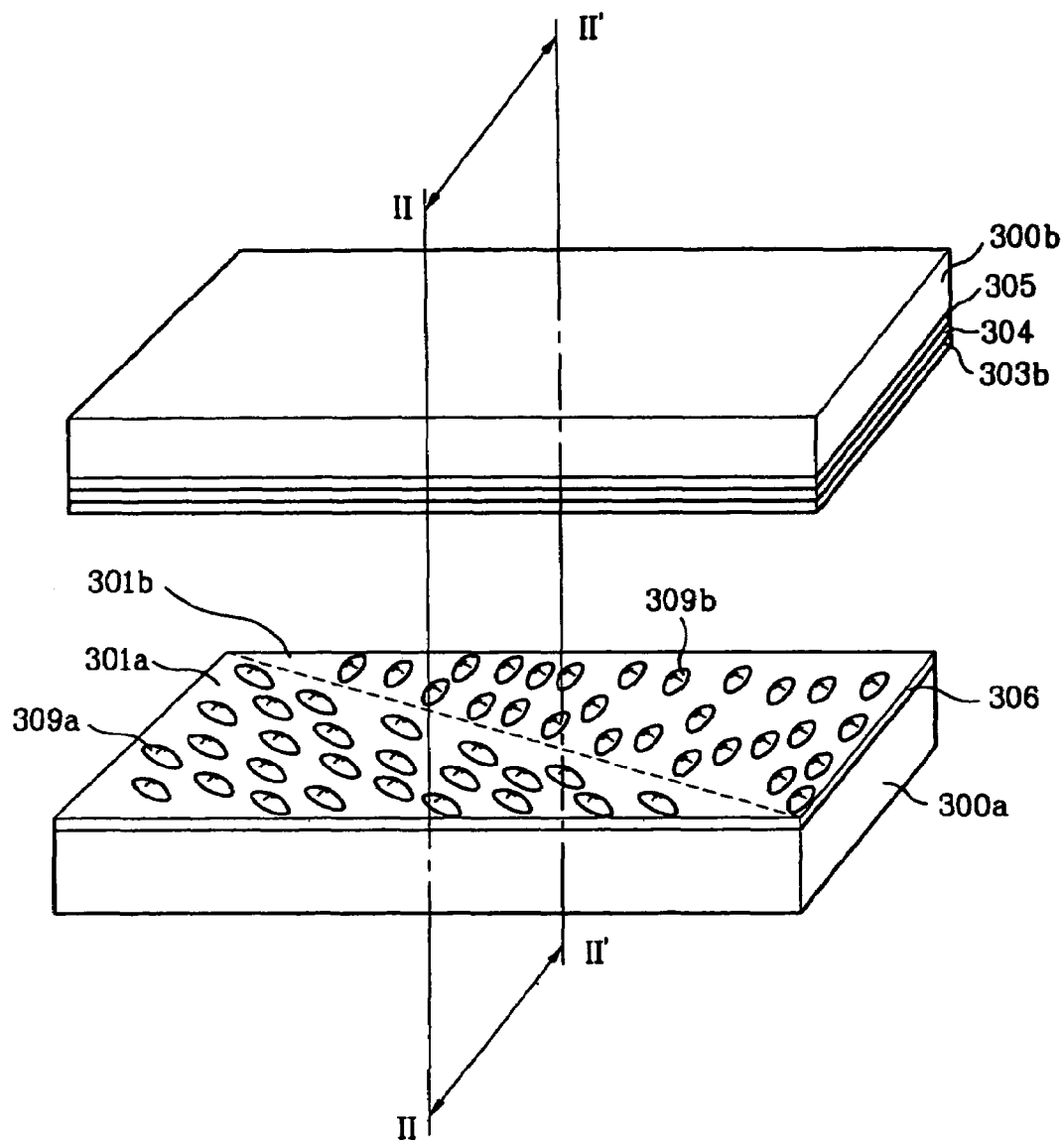
FIG. 3 is a schematic perspective view of an exemplary multi-domain LCD device according to the present invention.
Figure 4A:
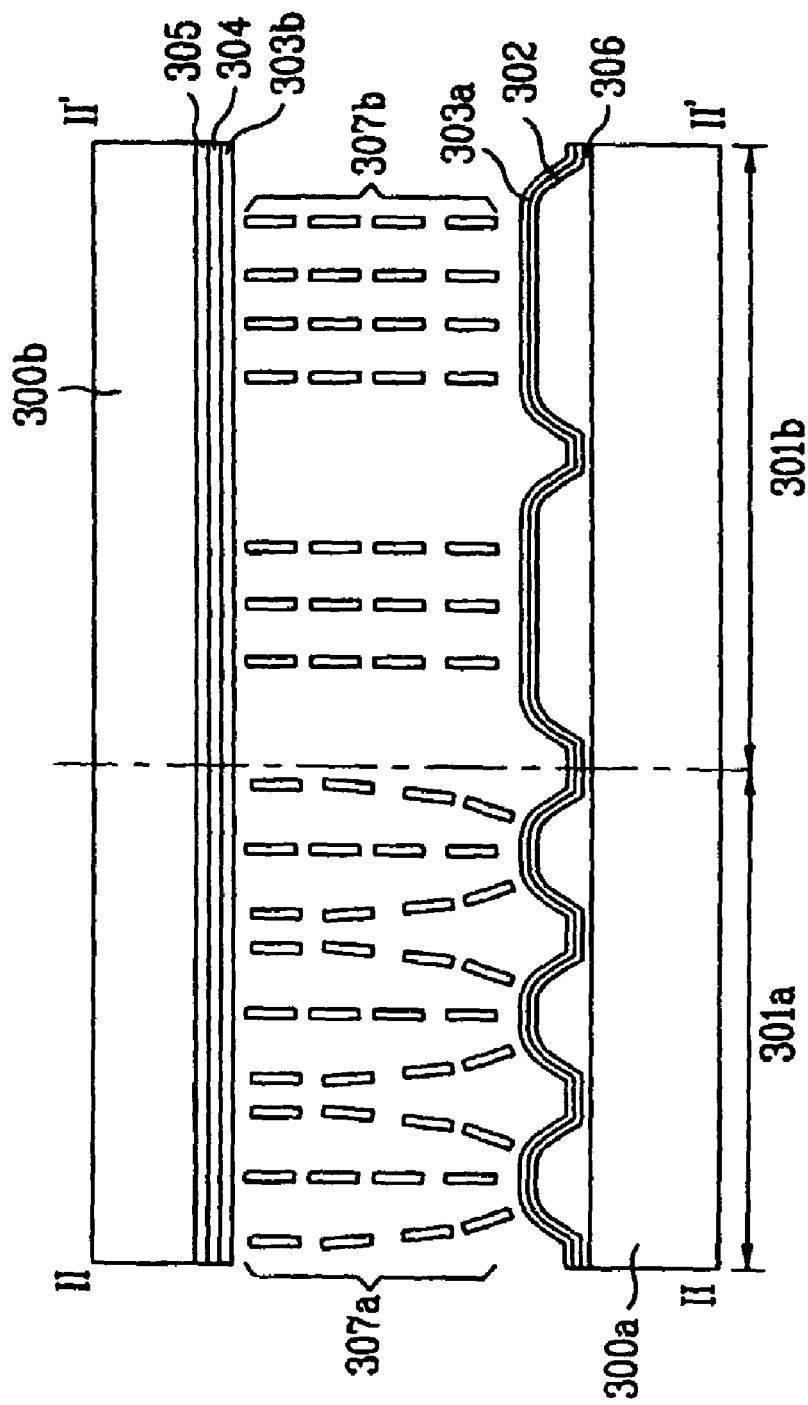
FIG. 4A is a cross sectional view along II-II' of FIG. 3 of liquid crystal molecules in a multi-domain LCD device according to the present invention.
Figure 4B:
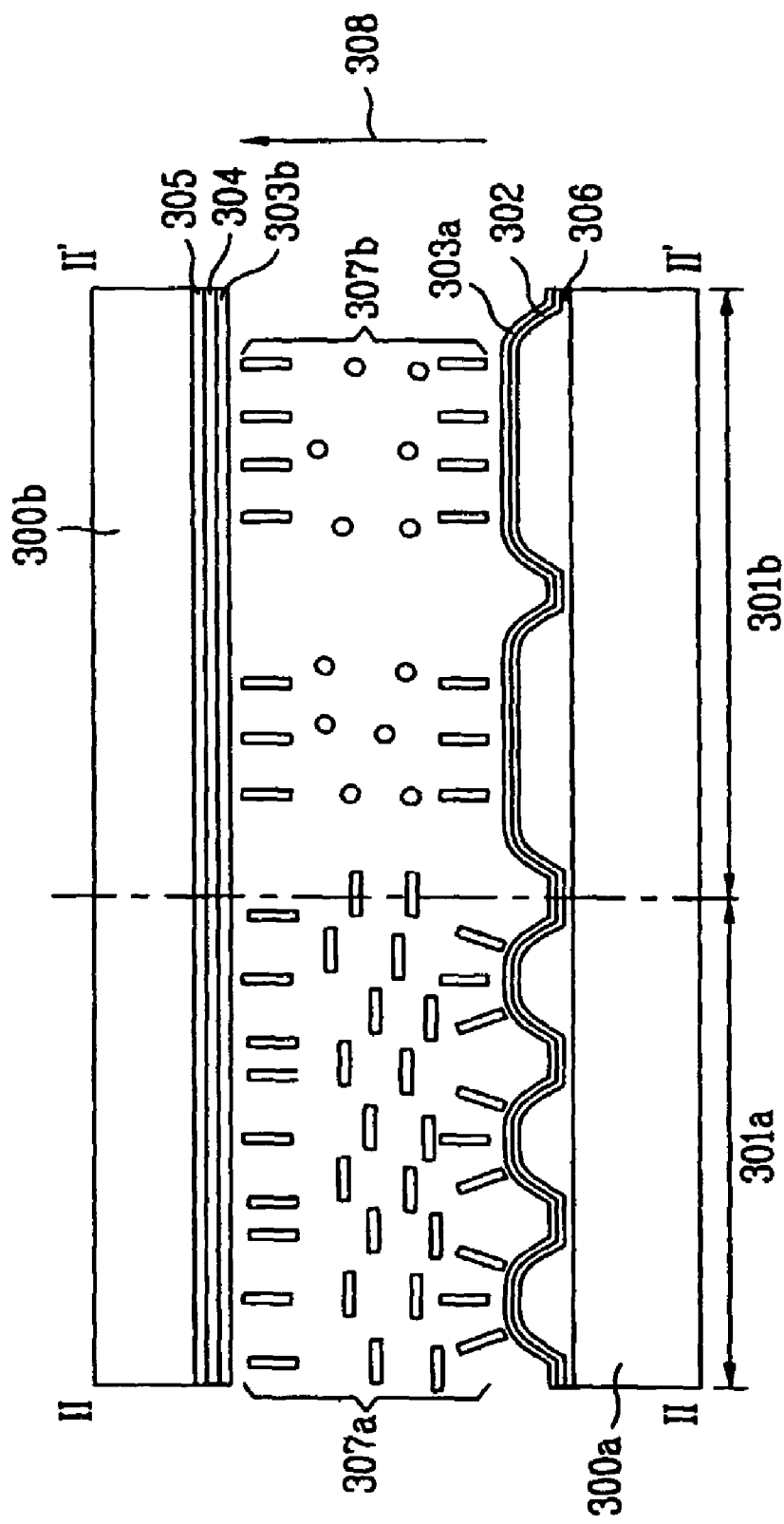
FIG. 4B is a cross sectional view along II-II' of FIG. 3 of liquid crystal molecules in a multi-domain LCD device according to the present invention.

FIG. 3 is a perspective view schematically illustrating a multi-domain LCD device according to the first embodiment of the present invention, and FIG. 4A is a cross sectional view along II-II' of FIG. 3 of liquid crystal molecules in a multi-domain LCD device according to the present invention, and FIG. 4B is a cross sectional view along II-II' of FIG. 3 of liquid crystal molecules in a multi-domain LCD device according to the present invention. In FIG. 4A, a state of liquid crystal molecules is shown when an electric field is not applied in a multi-domain LCD device according to the present invention. In FIG. 4B, a state of liquid crystal molecules is shown when an electric field is applied in a multi-domain LCD device according to the present invention.

Figure 1:
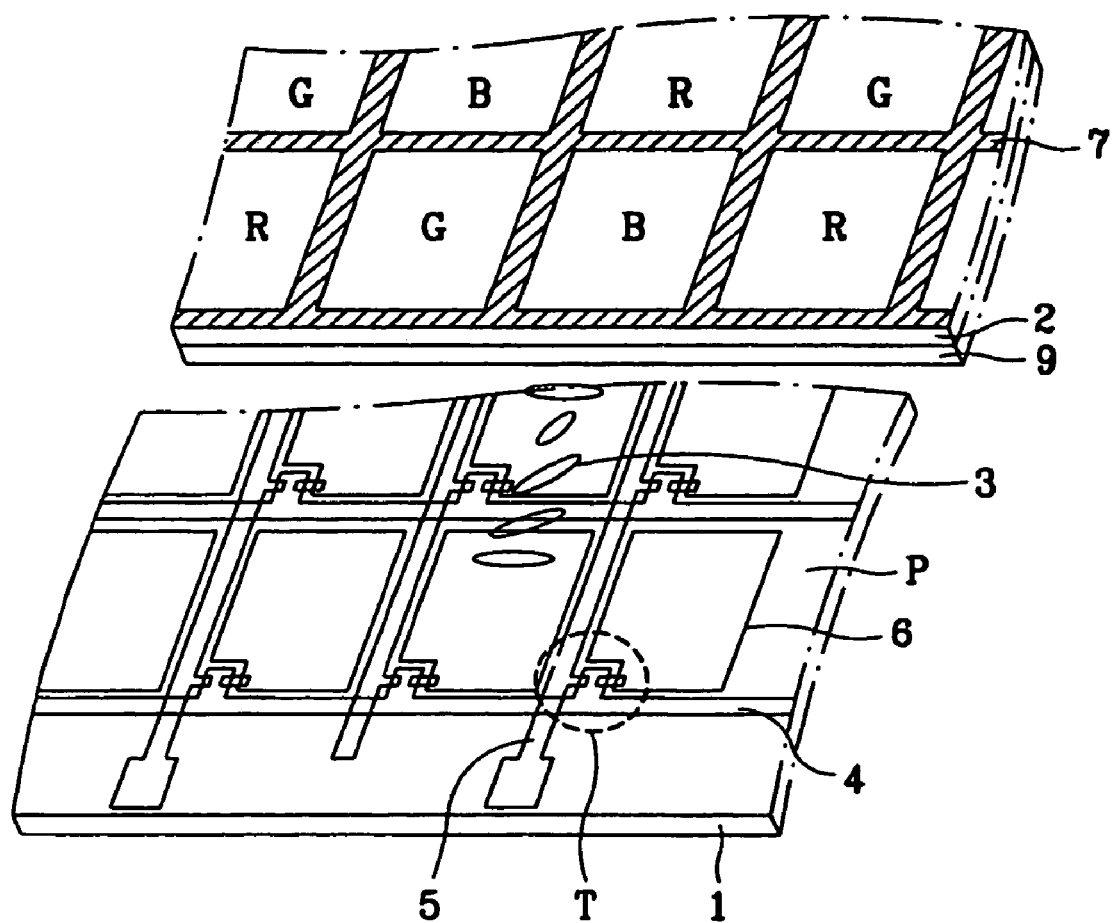
FIG. 1 is a schematic perspective view of an LCD device according to the related art.
Figure 2:
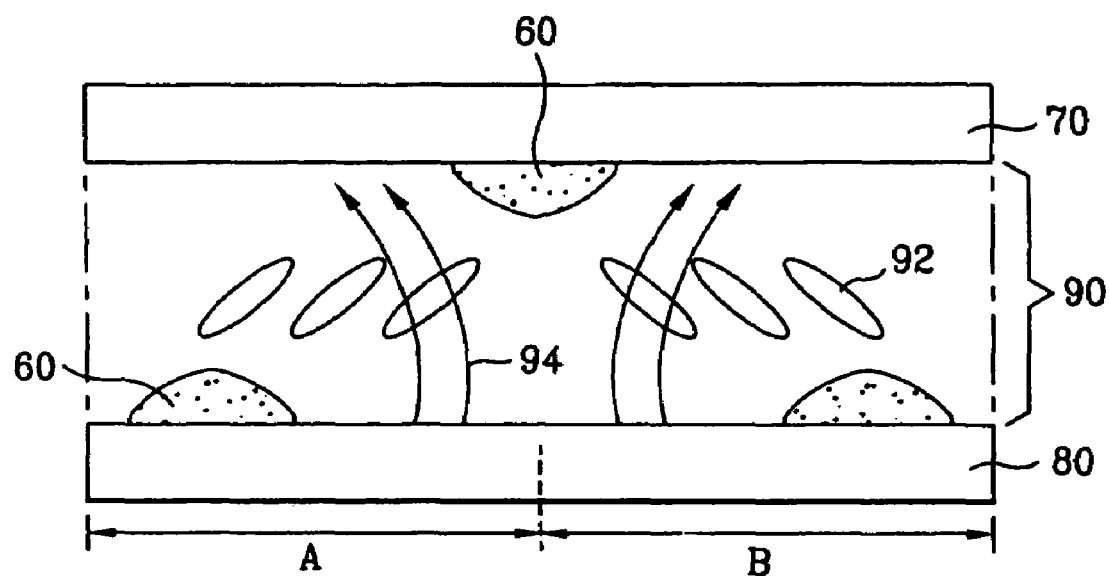
FIG. 2 is a cross sectional view of a unit pixel for a multi-domain LCD device according to the related art.

In FIGS. 3, 4A, and 4B, a multi-domain LCD device may include a first substrate and a second substrate 300a and 300b. Although not specifically shown, but similar to the structures shown in FIG. 1, the first substrate 300a may include a plurality of orthogonal gate and data lines, which may define a plurality of pixel regions, pixel electrodes formed in the pixel regions, and a plurality of TFTs at respective crossing portions of the gate and data lines. The plurality of TFTs may be turned ON/OFF according driving signals transmitted along the gate lines to provide video signals transmitted along the data lines to the respective pixel electrodes.

In FIGS. 3, 4A, and 4B, each of the pixel regions may be divided into first and second domains 301a and 301b. Accordingly, a pixel electrode (i.e., reflective electrode) 302 may include a plurality of protrusions 309a and 309b, may be formed within the first and second domains 301a and 301b. In addition, the protrusions 309a of the first domain 301a may be arranged differently from the protrusions 309b of the second domain 301b.

The second substrate 300b may be formed to oppose the first substrate 300a. The second substrate 300b may include a black matrix layer (not shown) for preventing light leakage within regions, except the pixel regions of the first substrate 300a, an R/G/B color filter layer 305 for producing colored light, a common electrode 304, and a second alignment layer 303b to provide vertical alignment of liquid crystal molecules. Accordingly, liquid crystal layers 307a and 307b may be formed between the first and second substrates 300a and 300b.

Formation of the plurality of protrusions 309a and 309b within the pixel electrode 302 may first include forming an insulating layer 306 on first the substrate 300a, and forming the pixel electrode 302 on in the insulating layer 306. Accordingly, the pixel electrodes 302 may have the plurality of protrusions 309a and 309b formed on the insulating layer 306.

Next, a first alignment layer 303a may be formed on the pixel electrodes 302 including the plurality of protrusions 309a and 309b. The plurality of protrusions 309a and 309b may each have an elliptical shape having long-axis (major-axis) and short-axis (minor-axis) directions. In addition, the major-axis direction of the protrusions 309a formed within the first domain 301a of the first substrate 300a may cross the major-axis direction of the protrusions 309b formed within the second domain 301b of the first substrate 300a.

In FIGS. 4A and 4B, the elliptical-shaped protrusions 309a formed within the first domain 301a may have widths corresponding to the minor-axis direction, and the elliptical-shaped protrusions 309b formed within the second domain 301b may have widths corresponding the major-axis direction. In addition, the protrusions 309a and 309b may be compactly formed at irregular intervals in order to provide diffused reflection of incident light. However, the plurality of protrusions 309a or 309b formed within the same domain 301a or 301b of one pixel region may have their major-axes formed along one direction. Thus, an additional alignment process for aligning liquid crystal molecules of the liquid crystal layers 307a and 307b to the first and second alignment layers 303a and 303b may not be necessary.

When images are displayed by reflection of the incident light within the color filter layer 305 without using an additional backlight device, the pixel electrodes 302 of the first substrate 300a may be formed of metal having a relatively high reflectivity. In a transmitting-type LCD device using an additional backlight device, the pixel electrodes 302 of the first substrate 300a may be formed of a transparent electrode material. Accordingly, the pixel electrode 302 formed of the relatively high reflectivity metal may be more advantageous than the transparent electrode material. For example, if the pixel electrode 302 is formed of the relatively high reflectivity metal, the plurality of protrusions 309a and 309b formed within the pixel electrode 302 diffuse and reflect the incident light, thereby obtaining uniform luminance along an entire surface of the color filter layer 305.

When a voltage is supplied to the pixel electrode 302 and the common electrode 304, an electric field may be formed between the pixel electrode 302 and the common electrode 304. Accordingly, the electric field affects the major-axes direction of the liquid crystal molecules within the liquid crystal layers 307a and 307b, wherein the liquid crystal layers 307a and 307b may be formed of negative-type liquid crystal material. For example, when the electric field is not supplied to the pixel electrode 302 and the common electrode 304, the liquid crystal molecules of the liquid crystal layers 307a and 307b may be aligned along a direction vertical to the first and second alignment layers 303a and 303b. Conversely, when the electric field is supplied to the pixel electrode 302 and the common electrode 304, the liquid crystal molecules of the liquid crystal layers 307a and 307b may be aligned along a direction parallel to the first and second alignment layers 303a and 303b.

In FIG. 4A, when the voltage is not supplied to the pixel electrode 302 and the common electrode 304, the electric field is not formed between the pixel electrode 302 and the common electrode 304. Accordingly, the major-axes of the liquid crystal molecules of the liquid crystal layers 307a and 308b formed in the first and second domains 301a and 301b may be aligned along a direction vertical to the first and second alignment layers 303a and 303b. For example, the first alignment layer 303a formed within the first domain 301 of the first substrate 300a may be formed having a shape similar to a shape of the elliptical protrusion 309a formed below the first alignment layer 303a, whereby the first alignment layer 303a may have the similar inclined side surfaces as inclined surfaces of the protrusions 309a. Thus, the major-axes of the liquid crystal molecules adjacent to the first alignment layer 303a may be arranged along the direction vertical to the inclined surfaces of the first alignment layer 303a due to a vertical alignment restrictive force.

Along a direction from the first alignment layer 303a to the second alignment layer 303b, the major-axes of the liquid crystal molecules may be changed to be aligned along a direction vertical to the second alignment layer 303b due to a vertical alignment force of the second alignment layer 303b. Similarly, along the direction from the first alignment layer 303a to the second alignment layer 303b, the major-axes of the liquid crystal molecules formed within the second domain 301b may be aligned along a direction vertical to the second alignment layer 303b. Accordingly, there may be no difference in the major-axes directions of the liquid crystal molecules between the first and second domains 301a and 301b.

Figure 5:
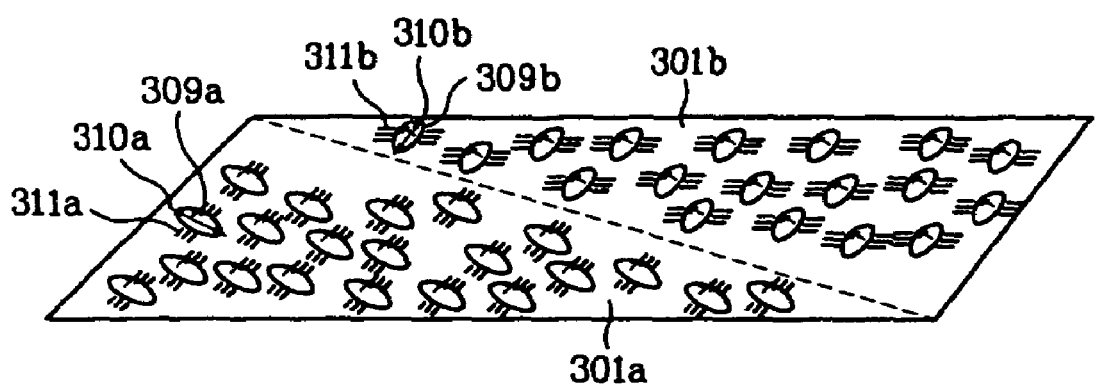
FIG. 5 is a schematic perspective view of liquid crystal molecules in a multi-domain LCD device according to the present invention.

When the voltage is supplied to the pixel electrode 302 and the common electrode 304, the electric field 308 may be formed between the pixel electrode 302 and the common electrode 304. Then, as shown in FIG. 4B, the major-axes of the liquid crystal molecules formed within the first and second domains 301a and 301b may be changed to be aligned along a direction vertical to the electric field 308. For example, as shown in FIG. 5, the major-axes directions 310a of the elliptical protrusions 309a within the first domain 301a may cross the major-axes directions 310b of the elliptical protrusion 309b within the second domain 301b. Accordingly, the major-axes directions of the liquid crystal molecules 311a along the major-axes directions 310a of the elliptical protrusions 309a within the first domain 301a may cross the major-axes directions of the liquid crystal molecules 311b along the major-axes directions 310b of the elliptical protrusions 309b within the second domain 301b. Thus, the major-axes directions of the liquid crystal molecules adjacent to the first and second alignment layers 303a and 303b may be effected by the vertical alignment restrictive forces while having less of an effect from the electric field 308, whereby the liquid crystal molecules adjacent to the first and second alignment layers 303a and 303b may be maintained in an initial alignment state. As a result, the liquid crystal molecules may be aligned differently within the two domains 301 and 301b, thereby obtaining a multi-domain LCD device.

Figure 6A:
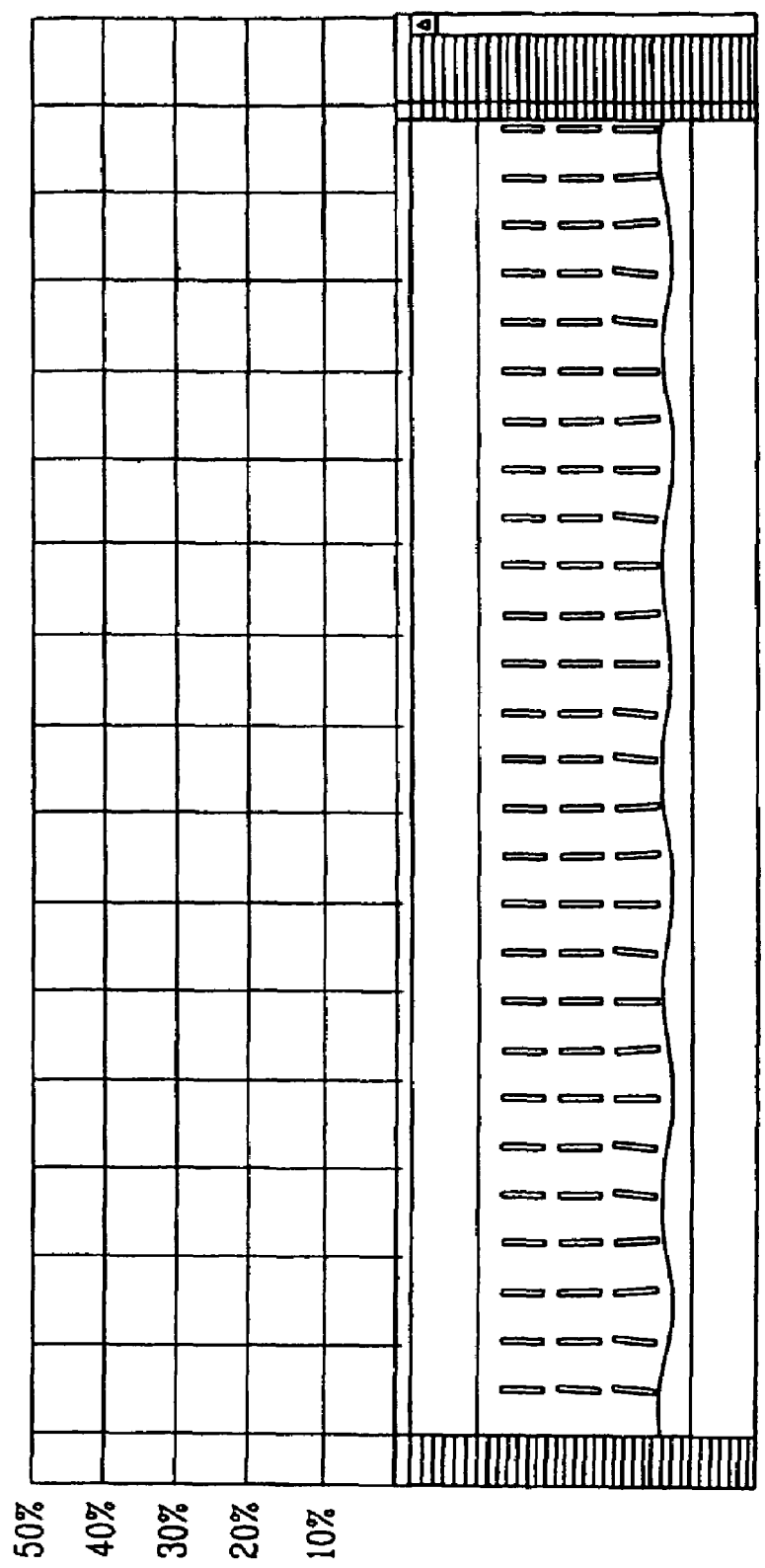
FIG. 6A is a diagram of liquid crystal molecules in a multi-domain LCD device according to the present invention.
Figure 6B:
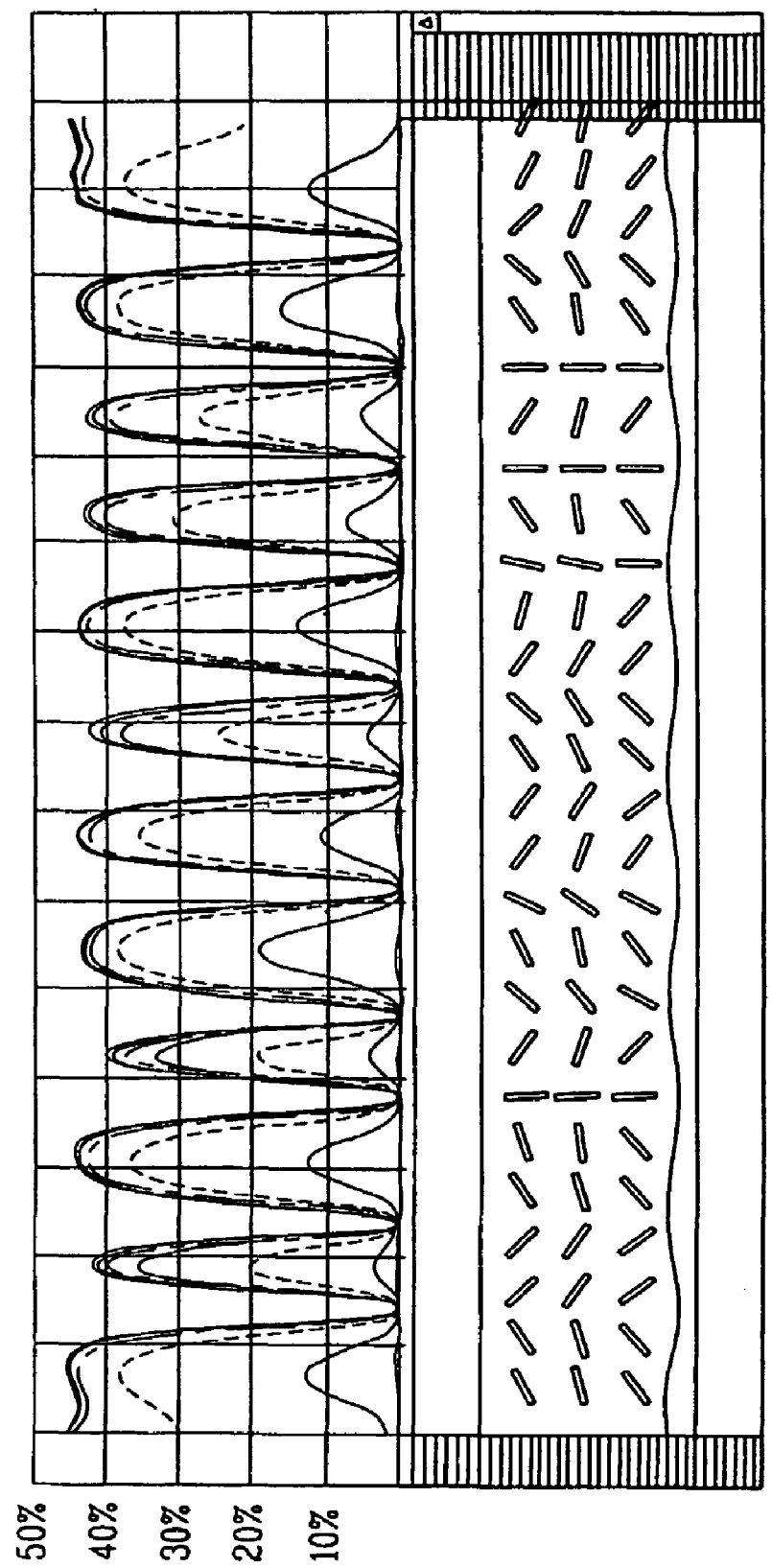
FIG. 6B is a diagram of liquid crystal molecules in a multi-domain LCD device according to the first embodiment of the present invention.

FIG. 6A is a diagram of liquid crystal molecules in a multi-domain LCD device according to the present invention;

FIG. 6B is a diagram of liquid crystal molecules in a multi-domain LCD device according to the present invention, wherein the multi-domain LCD device may be shown in FIGS. 4A and/or 4B. FIG. 6A shows light transmittance of liquid crystal molecules when an electric field is not applied in a multi-domain LCD device according to the present invention. FIG. 6B shows light transmittance of liquid crystal molecules when an electric field is applied in a multi-domain LCD device according to the present invention. Accordingly, FIGS. 6A and 6B demonstrate any one of the first and second domains 301a and 301b.

In FIG. 6A, before applying an electric field via pixel and common electrodes 302 and 304, the major-axes of the liquid crystal molecules may be aligned along a direction vertical to first and second substrates 300a and 300b. Accordingly, the elliptical protrusions 309a or 309b may be formed below the first alignment layer 303a, whereby the first alignment layer 303 may have inclined surfaces similar to inclined surfaces of the protrusions 309a or 309b. Thus, the major-axes of the liquid crystal molecules adjacent to the first alignment layer 303a may be vertical to the inclined surfaces of the first alignment layer 303a, wherein the major-axes of the liquid crystal molecules corresponding to both inclined surfaces of the first alignment layer 303a may be formed at an angle of about ±10° to the first substrate 300a. In addition, the major-axes of the liquid crystal molecules corresponding to uppermost (i.e., flat) surfaces of the first alignment layer 303a may be formed at an angle of about 90° to the first substrate 300a. As shown in FIGS. 4A and 4B, the second alignment layer 303b of the second substrate 300b may include a flat surface having no elliptical protrusions 309a and 309b (in FIG. 5), whereby the major-axes of the liquid crystal molecules adjacent to the second alignment layer 303b may be formed at an angle of about 90° to the second substrate 300b. When no electric field is applied, transmittance of the liquid crystal layer is approximately 0, thereby displaying a black state.

In FIG. 6B, when applying an electric field to the liquid crystal molecules, the major-axes of the liquid crystal molecules may be aligned vertical to the electric field direction, thereby improving light transmittance. Since the major-axes of the liquid crystal molecules corresponding to the inclined surfaces of the first alignment layer 303a have a certain alignment direction with respect to the first substrate 300a, the liquid crystal molecules are inclined along a constant direction by applying the electric field, thereby obtaining a normal light transmittance. However, the liquid crystal molecules on the uppermost (flat) surfaces of the first alignment layer 303a may not be inclined with respect to the first substrate 300a, for example, at an angle of about 90°. Thus, when the electric field is applied to the liquid crystal molecules, the liquid crystal molecules may be irregularly inclined. Accordingly, an area having the irregularly inclined liquid crystal molecule may have a disclination line, wherein it is not possible to control the alignment of the liquid crystal molecules, thereby lowering the light transmittance. However, the area having the disclination line is negligible as compared with normal operation areas, so that the light transmittance may not be significantly affected by the area having the disclination line.

Figure 7E:
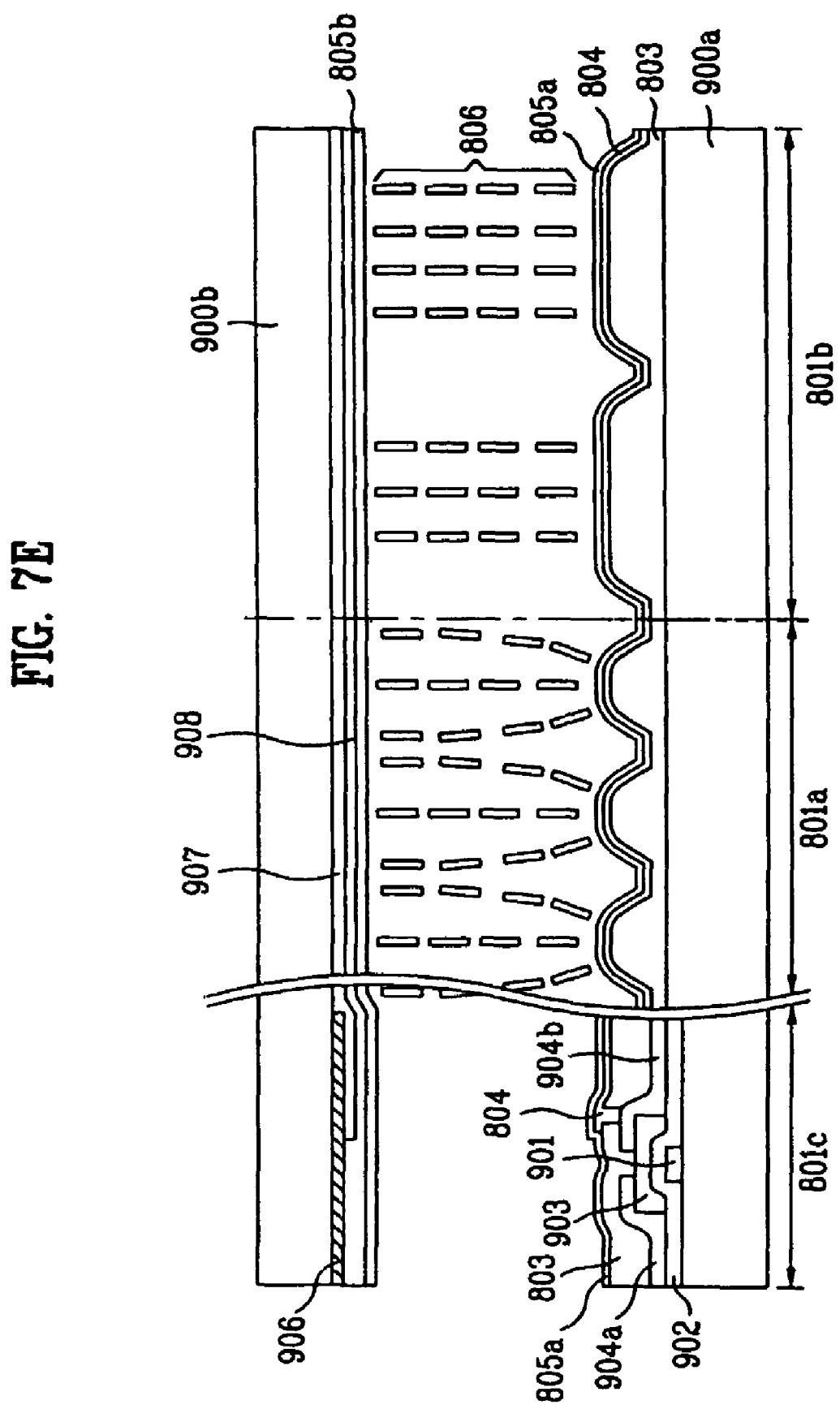

FIG. 7A to FIG. 7E are cross sectional views of an example method of fabricating a multi-domain LCD device according to the present invention. In FIG. 7A, a gate electrode (not shown) having a gate electrode 901 may be formed on a first substrate 900a, and a gate insulating layer 902 may be formed along an entire surface of the first substrate 900a including the gate electrode 901. Next, a semiconductor layer 903 may be formed on the gate insulating layer 902 above the gate electrode 901. In addition, a data line (not shown) having source and drain electrodes 904a and 904b overlapped with both sides of the semiconductor layer 903 may be formed on the gate insulating layer 902 along a direction perpendicular to the gate line. Then, an organic insulating layer 803 for planarization and transmittance may be formed on the gate insulating layer 902 including the source and drain electrodes 904a and 904b.

In FIG. 7B, a photoresist (not shown) may be deposited on the organic insulating layer 803, and then selectively removed by photolithographic processes, thereby forming a plurality of protrusions within first and second domains 801a and 801b. The protrusions within the first domain 801a may have widths that are different from widths of the protrusions within the second domain 801b. As shown in FIG. 3, the plurality of protrusions may each have an elliptical shape having major-axes and minor-axes, wherein the major-axes direction of the protrusions within the first domain 801a may cross the major-axes direction of the protrusions within the second domain 801b. In FIGS. 7B to 7E, the plurality of protrusions within the first domain 801a each may have a width along the minor-axes direction, and the plurality of protrusions within the second domain 801b each may have a width along the major-axes direction.

In FIG. 7C, portions of the organic insulating layer 803 may be selectively removed above the drain electrode 904b, thereby forming a contact hole. Then, a pixel electrode 804 may be formed on the organic insulating layer 803 of the pixel region to be connected to the drain electrode 904b through the contact hole. Since the organic insulating layer 803 may include the plurality of protrusions, the pixel electrodes 804 may be formed to each have shapes corresponding to the plurality of protrusions. The pixel electrode 804 may be formed of a metal material having high reflectivity, or of a transparent conductive material, such indium-tin-oxide (ITO).

In FIG. 7D, a first alignment layer 805a may be formed along an entire surface of the first substrate 900a including the pixel electrode 804. The first alignment layer 805a may be formed using one of a spinning, spraying, dipping, or printing methods, and may be formed of polyamide or polyimide group compound materials, such as polyvinylalcohol (PVA), polyamic acid material, or may be formed of photoreactive materials, such as polyvinylcinnamate (PVCN), polysiloxanecinnamate (PSCN), or cellulosecinnamate (CelCN). The first alignment layer 805a may be formed to provide a vertical alignment of the liquid crystal molecules within the liquid crystal layer, wherein additional alignment processes may not be necessary.

In FIG. 7E, a black matrix layer 906 may be formed on a second substrate 900b to prevent light leakage on portions, except for the pixel regions, and a color filter layer 907 may be formed to produce colored light within the pixel regions. In addition, a common electrode 908 may be formed along an entire surface of the second substrate 900b including the color filter layer 907, and a second alignment layer 805b may be formed on the common electrode 908. The second alignment layer 805b may be formed of the same material as the first alignment layer 805a, wherein the second alignment layer 805b may not require additional alignment processes.

Although not shown, a plurality of spacers and sealant material may be formed on one or both of the first and/or second substrate 900a and/or 900b, and the first and second substrates 900a and 900b may be bonded to each other. Then, the liquid crystal layer 806 having the liquid crystal molecules aligned along the vertical direction may be formed between the first and second substrates 900a and 900b. When an inlet is formed within the sealant, the first and second substrates 900a and 900b may be bonded to each other by the sealant while being maintained in a vacuum state. Accordingly, the inlet may be dipped into a vessel having liquid crystal material, whereby the liquid crystal may be injected between the first and second substrates 900a and 900b by osmotic action, thereby forming the liquid crystal layer 806. Alternatively, the liquid crystal material may dispersed on one of the first and second substrates 900a and 900b, and then the first and second substrates 900a and 900b may be bonded to each other.

Figure 8:
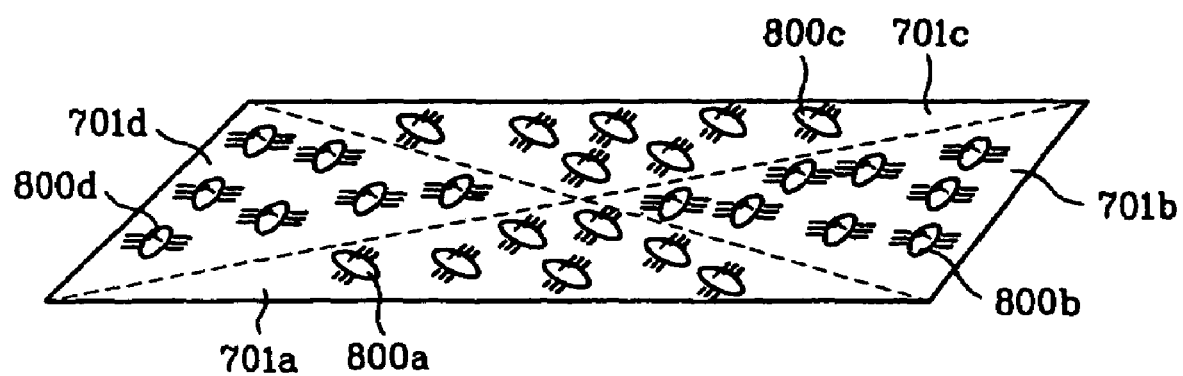
FIG. 8 is a schematic perspective view of another exemplary multi-domain LCD device according to the present invention.

FIG. 8 is a schematic perspective view of another exemplary multi-domain LCD device according to the present invention. In FIG. 8, one pixel region may be divided into first, second, third, and fourth domains 701a, 701b, 701c, and 701d, and a plurality of elliptical protrusions 800a, 800b, 800c, and 800d may be formed within the respective first, second, third, and fourth domains 701a, 701b, 701c, and 701d. Accordingly, the major axes directions of the plurality of protrusions 800a, 800b, 800c, and 800d may be different within each of the first, second, third, and fourth domains 701a, 701b, 701c, and 701d, thereby obtaining a multi-domain LCD device having at least four domains. Of course, an LCD device according to the present invention may be provided having an increased number of domains, such as 6, 8, 10, . . . .

The elliptical protrusions 800a of the first domain 701a may have major-axes directions similar to major-axes directions of the elliptical protrusions 800c of the third domain 701c. Similarly, the elliptical protrusions 800b may have major-axes directions similar to major-axes directions of the elliptical protrusions 800d of the fourth domain 701d. In addition, the major-axes directions of the protrusions 800a and 800c within the first or third domain 701a or 701c may have a direction vertical to the major-axes directions of the protrusions 800b and 800d within the second or fourth domain 701b or 701d. Moreover, the major-axes directions within each of the first, second, third, and fourth domains 701a, 701b, 701c, and 701d may be different.

According to the present invention, A plurality of protrusions of a pixel electrode may be aligned along different directions within different domains of a pixel region to obtain a multi-domain LCD device having high aperture ratio and without requiring additional structures. In addition, a simplified fabrication process may be achieved, thereby decreasing manufacturing costs. Furthermore, a reflective- or transmitting-type multi-domain LCD device may be fabricated according to materials of a pixel electrode, thereby improving efficiency.

It will be apparent to those skilled in the art that various modifications and variations can be made in the multi-domain liquid crystal display device and method for fabricating a multi-domain liquid crystal display device of the present invention without departing from the spirit or scope of the invention. Thus, it is intended that the present invention cover the modifications and variations of this invention provided they come within the scope of the appended claims and their equivalents.

What is claimed is:

1. A multi-domain liquid crystal display (LCD) device, comprising:
   a plurality of gate and data lines perpendicular to each other on a first substrate defining a plurality of pixel regions, each of the pixel regions divided into at least first and second domains, wherein the first and second domains are symmetric with respect to a virtual line which divides the pixel region into the first and second domains;
   a plurality of thin film transistors each at a crossing portion of the gate and data lines;
   an insulating layer within each of the pixel regions and having a plurality of first protrusions arranged along different directions in each of the first and second domains of the pixel regions, wherein each of the protrusions is formed as an elliptical shape having major-axes and minor-axes, and the major-axes of the protrusions within the first domain are disposed along a direction vertical to a direction of the major-axes of the protrusions within the second domain;
   a plurality of pixel electrodes on the insulating layer, each pixel electrode having a plurality of second protrusions corresponding to the first protrusions of the insulating layer;
   a second substrate having a black matrix layer and a color filter layer; and
   a liquid crystal layer between the first and second substrates.

2. The device according to claim 1, further comprising a first alignment layer on the pixel electrodes and a second alignment layer on the second substrate.

3. The device according to claim 1, wherein each of the pixel electrodes is formed of a relatively high reflectivity metal material.

4. The device according to claim 1, wherein each of the pixel electrodes is formed of a transparent conductive material.

5. The device according to claim 1, wherein the liquid crystal layer is formed of vertical-alignment type liquid crystal material.

6. A method for fabricating a multi-domain liquid crystal display (LCD) device, comprising the steps of:
   forming a plurality of gate and data lines perpendicular to each other on a first substrate to define a plurality of pixel regions, each of the pixel regions includes at least first and second domains, wherein the first and second domains are symmetric with respect to a virtual line which divides the pixel region into the first and second domains;
   forming a gate insulating layer along an entire surface of the substrate including the gate lines;
   forming a plurality of semiconductor layers on the gate insulating layer, each semiconductor layer disposed above a gate electrode corresponding to the gate lines;
   forming source and drain electrodes on each of the semiconductor layers, the source electrode extending from one of the data lines;
   forming an insulating layer on the first substrate;
   etching the insulating layer to form a plurality of first protrusions and to form a plurality of second protrusions, wherein each of the first and second protrusions is formed as an elliptical shape having major-axes and minor-axes, and the major-axes of the first protrusions within the first domain are disposed along a direction vertical to a direction of the major-axes of the second protrusions within the second domain;

forming a plurality of pixel electrodes on the plurality of first protrusions and the plurality of second protrusions;

forming a first alignment layer along an entire surface of the first substrate including the pixel electrodes;

forming a black matrix layer and a color filter layer on a second substrate;

attaching the first and second substrates together; and forming a liquid crystal layer between the first and second substrates.

* * * * *